United States Patent
Tomita et al.

(10) Patent No.: US 11,437,633 B2
(45) Date of Patent: Sep. 6, 2022

(54) FUEL CELL SEAL STRUCTURE

(71) Applicant: NOK CORPORATION, Tokyo (JP)

(72) Inventors: Ryo Tomita, Kanagawa (JP); Hajime Yui, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 95 days.

(21) Appl. No.: 17/158,211

(22) Filed: Jan. 26, 2021

(65) Prior Publication Data

US 2021/0234178 A1 Jul. 29, 2021

(30) Foreign Application Priority Data

Jan. 27, 2020 (JP) .............................. JP2020-011108

(51) Int. Cl.
*H01M 8/0276* (2016.01)
*H01M 8/0232* (2016.01)

(52) U.S. Cl.
CPC ....... *H01M 8/0276* (2013.01); *H01M 8/0232* (2013.01)

(58) Field of Classification Search
None
See application file for complete search history.

(56) References Cited

U.S. PATENT DOCUMENTS

| 10,305,135 B2 | 5/2019 | Sakano et al. |
| 2017/0222247 A1 | 8/2017 | Sakano et al. |

FOREIGN PATENT DOCUMENTS

| EP | 2958175 | * 12/2015 | ............ H01M 8/02 |
| JP | 10-241708 | * 9/1998 | ............ H01M 8/02 |
| JP | 2017-139218 | 8/2017 | |

* cited by examiner

*Primary Examiner* — Helen Oi K Conley
(74) *Attorney, Agent, or Firm* — Greenblum & Bernstein, P.L.C.

(57) ABSTRACT

A fuel cell seal structure includes stacked fuel cells and an electrolyte membrane or a film supported between the neighboring metal separators. Each of the stacked fuel cells includes neighboring metal separators each including a plate portion having a plate portion surface, a bead seal portion projecting from the plate portion surface and including a distal end having a distal end surface, an elastic body disposed on the distal end surface, and a stopper disposed on the plate portion surface and away from the elastic body. The neighboring metal separators are disposed such that elastic bodies are located opposed to each other in a stacking direction with the electrolyte membrane or the film supported in between the elastic bodies and face each other, and such that stoppers are located neighboring to each other in the stacking direction with the electrolyte membrane or the film supported in between the stoppers.

8 Claims, 6 Drawing Sheets

FUEL CELL SEAL STRUCTURE

CROSS REFERENCE TO RELATED APPLICATIONS

This application claims the foreign priority benefit under 35 U.S.C. § 119 of Japanese patent application No. 2020-011108 filed on Jan. 27, 2020, the disclosure of which is incorporated herein by reference.

BACKGROUND OF THE INVENTION

1. Field of the Invention

The present invention relates to a fuel cell seal structure.

2. Description of the Related Art

Japanese Patent Application Publication No. 2017-139218 discloses a fuel cell seal structure in which a plurality of fuel cells are stacked. The fuel cell described in Japanese Patent Application Publication No. 2017-139218 includes an electrolyte membrane—electrode structure and a pair of metal separators sandwiching the electrolyte membrane—electrode structure.

The pair of metal separators each include a bead seal portion, and are arranged such that the bead seal portions face each other to form a seal region where reaction gases such as a fuel gas and an oxidizer gas are sealed.

In the case where a fuel cell is formed by supporting an electrolyte membrane or film with metal separators including bead seal portions, the sealing is secured by a bead reaction force of the bead seal portions. For this reason, the clearance of the fuel cell for generating the bead reaction force is important. However, in a fuel cell seal structure in which hundreds of fuel cells are stacked, it is difficult to maintain the clearances of the respective fuel cells uniform.

FIG. 7 is a cross-sectional view for explaining the amounts of deformation of bead seal portions 23 at the time when a pressure is applied to a fuel cell seal structure 4 according to Japanese Patent Application Publication No. 2017-139218. Metal separators 21 each include a plate portion 22, a bead seal portion 23, and an elastic body 24. When a pressure (load) acts in a direction in which the metal separators 21 are close to each other, the bead seal portions 23 of the metal separators 21 bend and deform. At this time, since the pressures applied to the respective metal separators 21 do not become uniform, the amounts of deformation of the bead seal portions 23 become non-uniform, and the clearances of the respective fuel cells 40 also become non-uniform.

In FIG. 7, distances W2, W3, W4, W5 each between the electrolyte membranes (or films) 30, 30, which each indicate the magnitude of deformation of the corresponding bead seal portion 23 are different from one another. There is a problem that if the difference in amount of deformation among the bead seal portions 23 upon receipt of a load is large and the clearances of the respective fuel cells 40 are non-uniform, stable reaction forces cannot be obtained.

SUMMARY OF THE INVENTION

The present invention has been made to solve the above issue, and an object of the present invention is to provide a fuel cell seal structure that is capable of enhancing the seal performance.

In response to the above issue, a fuel cell seal structure includes stacked fuel cells and an electrolyte membrane or a film supported between the neighboring metal separators. Each of the stacked fuel cells includes neighboring metal separators each including a plate portion having a plate portion surface, a bead seal portion projecting from the plate portion surface and including a distal end having a distal end surface, an elastic body disposed on the distal end surface, and a stopper disposed on the plate portion surface and away from the elastic body. The neighboring metal separators are disposed such that elastic bodies are located opposed to each other in a stacking direction with the electrolyte membrane or the film supported in between the elastic bodies and face each other, and such that stoppers are located neighboring to each other in the stacking direction with the electrolyte membrane or the film supported in between the stoppers.

According to the above-described structure, the electrolyte membrane or film is supported by and between the neighboring elastic bodies to form a seal region. In addition, since a load can be received by the stoppers neighboring to each other in the stacking direction, a difference in amount of deformation among the bead seal portions can be made smaller, and a variation in clearance of the fuel cell can be reduced. This makes it possible to secure a stable reaction force in each fuel cell, and to thus enhance the seal performance.

According to the fuel cell seal structure of the present invention, it is possible to enhance the seal performance.

DETAILED DESCRIPTION OF THE EMBODIMENTS

Figure 1:
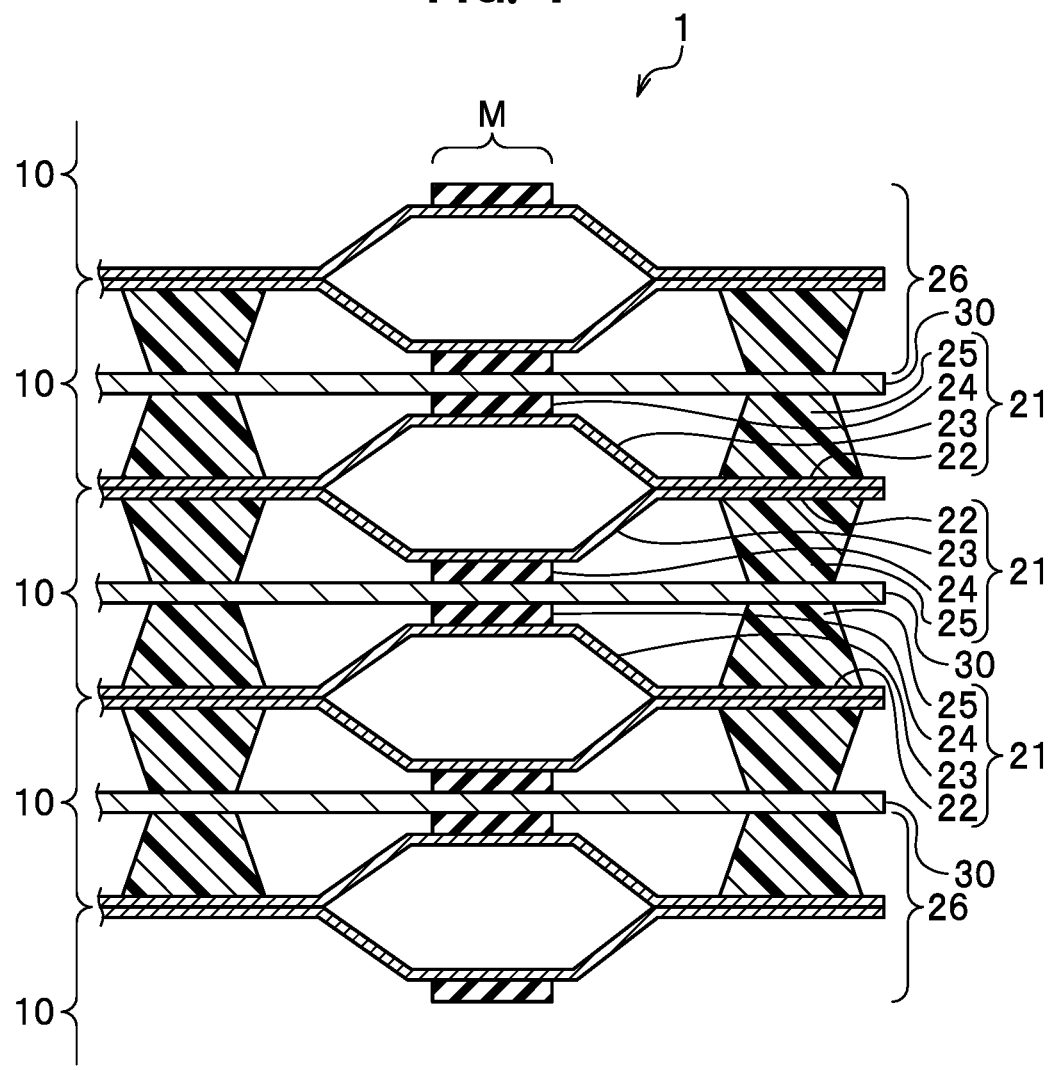
FIG. 1 is a main-part cross-sectional view of a fuel cell seal structure according to Embodiment 1.
Figure 1:
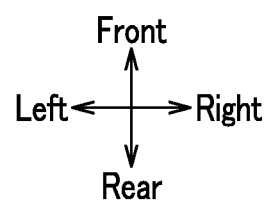

Hereinafter, modes (embodiments) for implementing the present invention will be described. However, the present invention is not limited to the content described below or the content illustrated in the drawings at all, and can be implemented while being modified as desired as long as such modification does not significantly impair the effects of the present invention. The present invention can be implemented by combining different embodiments. In the following description, the same components indifferent embodiments are denoted by the same reference signs, and repetitive description will be omitted. In addition, the same names are used for components having the same functions, and repetitive description will be omitted. In the cross-sectional views shown below, illustration of some of reference signs of members reiterated is omitted for simplifying the illustration. In addition, a "front face" in the description below means a face opposite to a "back face".

As shown in FIG. 1, a fuel cell seal structure 1 according to an embodiment has a stack structure in which a plurality of fuel cells 10 are stacked in a front-back direction. Each fuel cell 10 is formed by supporting an electrolyte membrane or film (hereinafter also referred to as "electrolyte membrane 30") with and between neighboring metal separators 21, 21.

Each metal separator 21 includes a plate portion 22, a bead seal portion 23 formed to protrude in a direction of the front face of the plate portion 22, an elastic body 24 provided on a front face of a front end of the bead seal portion 23, and stoppers 25 provided on a front face of the plate portion 22 and away from the elastic body 24. The neighboring metal separators 21, 21 are disposed such that the respective elastic bodies 24 face each other. Each electrolyte membrane 30 is supported by and between the elastic bodies 24, 24 opposed to each other in a stacking direction, and is supported by and between the stoppers 25, 25 opposed to each other in the stacking direction.

According to the fuel cell seal structure 1, since the stoppers 25, 25 neighboring to each other in the stacking direction receive a load, it is possible to reduce differences in amount of deformation among the bead seal portions 23, and to reduce variations in clearance among the fuel cells 10. In this way, since stable reaction forces can be secured in the respective fuel cells 10, it is possible to enhance the seal performance. Hereinafter, Embodiments will be described in detail.

Embodiment 1

(Structure)

FIG. 1 is a main-part cross-sectional view of a fuel cell seal structure according to Embodiment 1. As shown in FIG. 1, each fuel cell 10 is formed by supporting the electrolyte membrane 30 with and between the pair of metal separators 21, 21. The fuel cell 10 is a member that generates electricity through chemical reaction between hydrogen (fuel gas) from the anode and oxygen (oxidizer gas) from the cathode.

Figure 2:
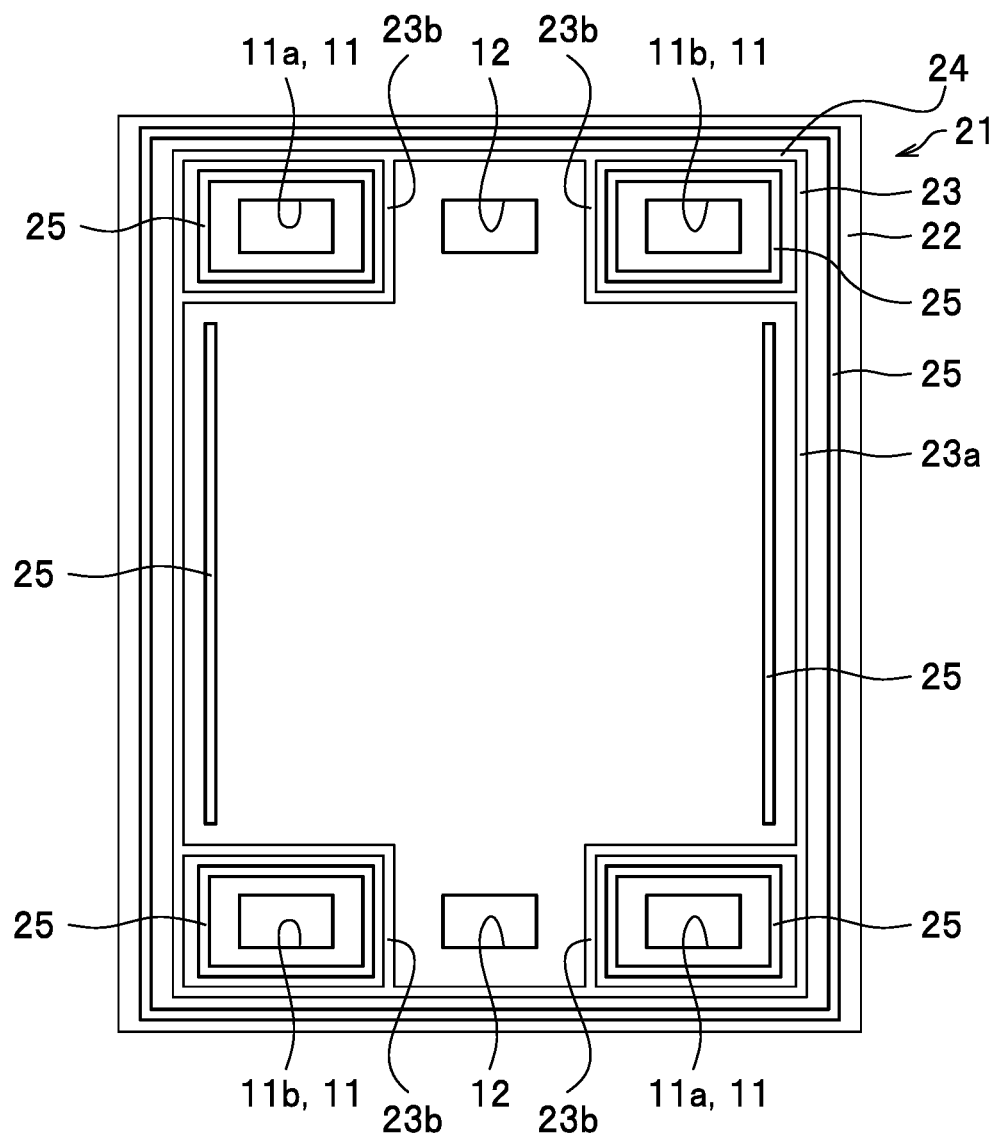
FIG. 2 is a top view of metal separators according to Embodiment 1.

As shown in FIGS. 1 and 2, each metal separator 21 includes the plate portion 22, the bead seal portion 23, the elastic body 24, and the stopper 25. The shape of the metal separator 21 is not particularly limited, but has a rectangular shape in this Embodiment.

As shown in FIG. 2, the plate portion 22 is a flat portion of the metal separator 21, and through-holes 11, 12 are formed on both end portions of the plate portion 22. Among the through-holes 11, the through-holes 11a, 11a are holes through which the fuel gas flows in the stacking direction. Among the through-holes 11, the through-holes 11b, 11b are holes through which the oxidizer gas flows in the stacking direction.

The through-holes 12 are holes through which a coolant passes in the stacking direction. In this Embodiment, four through-holes 11 and two through-holes 12 are formed, but this configuration does not limit the numbers, the shapes, the positions, and the like of the through-holes.

As shown in FIG. 1, the bead seal portion 23 is formed to protrude from the front face of the plate portion 22. The plate portion 22 and the bead seal portion 23 can be formed by pressing a metal flat plate. As shown in FIG. 2, the bead seal portion 23 includes an outer edge portion 23a and a surrounding portion 23b. The outer edge portion 23a is formed along the entire outer edge of the plate portion 22 in the peripheral direction. The surrounding portion 23b continues to the outer edge portion 23a, and is formed to surround the periphery along two sides of each through-hole 11a, 11b.

As shown in FIG. 1, on the front face of the front end of the bead seal portion 23, the elastic body 24 is disposed in the direction of extension of the bead seal portion 23. The elastic body 24 may be discontinuous, but is continuous over the direction of extension of the entire bead seal portion 23 in this Embodiment. The elastic body 24 may be formed of an elastic material, and for example, ethylene propylene diene rubber (EPDM), silicone rubber (VMQ), fluororubber (FKM), polyisobutylene (PIB), a resin, or the like can be used.

As shown in FIG. 1, the stoppers 25 are provided on the front face of the plate portion 22. The stoppers 25 are provided at both sides or one side of the bead seal portion 23 on the front face of the plate portion 22 in this Embodiment. In addition, the stoppers 25 are members separate from the elastic body 24, and are disposed away from the elastic body 24. As shown in FIG. 2, the stoppers 25 are disposed to be approximately parallel with the bead seal portion 23 in the direction of extension of the bead seal portion 23. In addition, the stoppers 25 are disposed around the through-holes 11a, 11b over the entire peripheral direction.

The stoppers 25 are formed of, for example, a rubber or a resin. The rubber is, for example, silicone rubber, fluororubber, ethylene propylene diene rubber, butyl rubber, or the like. The resin is, for example, a thermoplastic resin, a thermosetting resin, an engineering plastic, or the like.

As shown in FIG. 1, the thickness of the stoppers 25 is equal to the distance between the plate portion 22 and the electrolyte membrane 30 in the stacked state. In addition, the stoppers 25, 25 opposed to each other with the bead seal portion 23 in between, and the stoppers 25, 25 neighboring to each other with the electrolyte membrane 30 in between have an equal thickness or a substantially equal thickness.

As shown in FIG. 1, the electrolyte membrane 30 forms an electrolyte membrane•electrode structure (MEA: Membrane Electrode Assembly), and is formed of, for example, a solid electrolyte in the form of membrane or film. The electrolyte membrane•electrode structure includes a pair of catalyst layers and a pair of gas diffusion layers (both of which are not illustrated) at both sides of the electrolyte membrane 30.

As shown in FIG. 1, in the fuel cell 10, the neighboring metal separators 21, 21 are disposed such that the elastic bodies 24 face each other. In this way, the electrolyte membrane 30 is supported by and between the bead seal portions 23, 23 with the elastic bodies 24, 24 in between to form a seal region M that prevents the reaction gases from leaking. In addition, the stoppers 25, 25 neighboring to each other in the stacking direction hold the electrolyte membrane 30 in between, and also support a load acting on the fuel cell 10.

(Manufacturing Method)

Next, a method for manufacturing a fuel cell seal structure (fuel cell stack) will be described. In this manufacturing method, a metal separator forming step, a joint separator forming step, and a stacking step are conducted.

Figure 3:
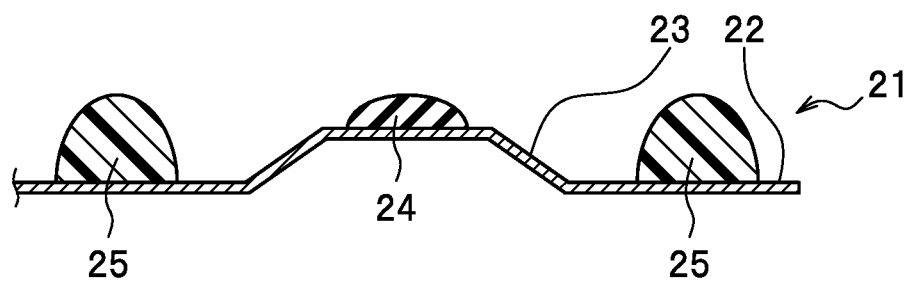
FIG. 3 is a main-part cross-sectional view of the metal separators.

As shown in FIG. 3, in the metal separator forming step, the through-holes 11a, 11b, 12 (see FIG. 2) are formed in a rectangular metal flat plate, for example. In addition, the metal flat plate is pressed to mold the plate portion 22 and the bead seal portion 23.

Next, in the metal separator forming step, the elastic body 24 is disposed on the front face of the front end of the bead seal portion 23 in the direction of extension. The elastic body 24 may be formed, for example, by molding the elastic body 24 and then attaching the elastic body 24 onto the bead seal portion 23. Note that the elastic body 24 may be molded integrally when the plate portion 22 and the bead seal portion 23 are molded.

In addition, in the metal separator forming step, the stoppers 25 are disposed at both sides or one side of the bead seal portion 23 along the bead seal portion 23. The stoppers 25 may be formed, for example, by a method such as injection molding, screen printing, dispenser, or ink-jet. If the thickness of the stoppers 25 is insufficient, overcoating may be conducted as appropriate.

Figure 4:
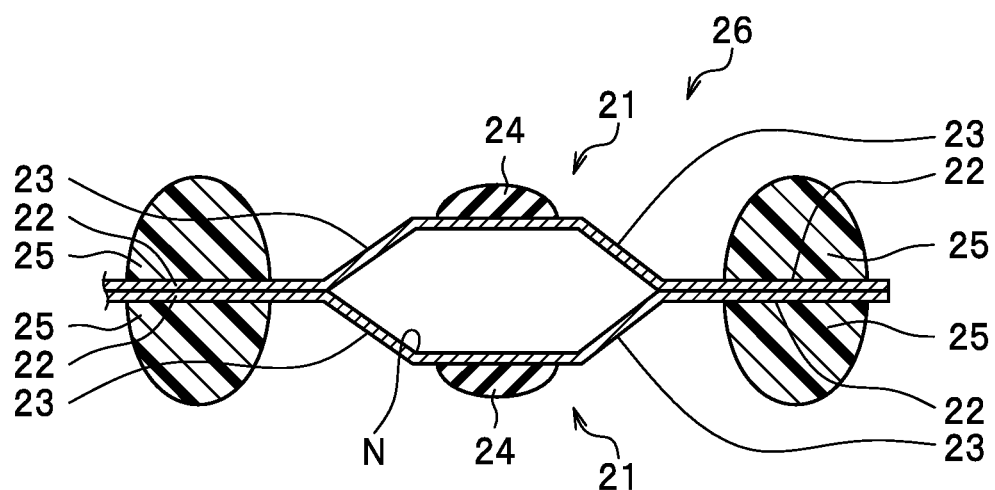
FIG. 4 is a main-part cross-sectional view of a joint separator.

As shown in FIG. 4, in the joint separator forming step, the back faces of the metal separators 21, 21 are placed and joined on each other with the positions of the bead seal portions 23, 23 being aligned with each other. In this way, a joint separator 26 is formed. The joining work may be conducted, for example, through brazing, staking, welding, or the like. The bead seal portions 23, 23 protrude in the opposite directions from each other, so that a hollow portion N is formed.

Figure 5:
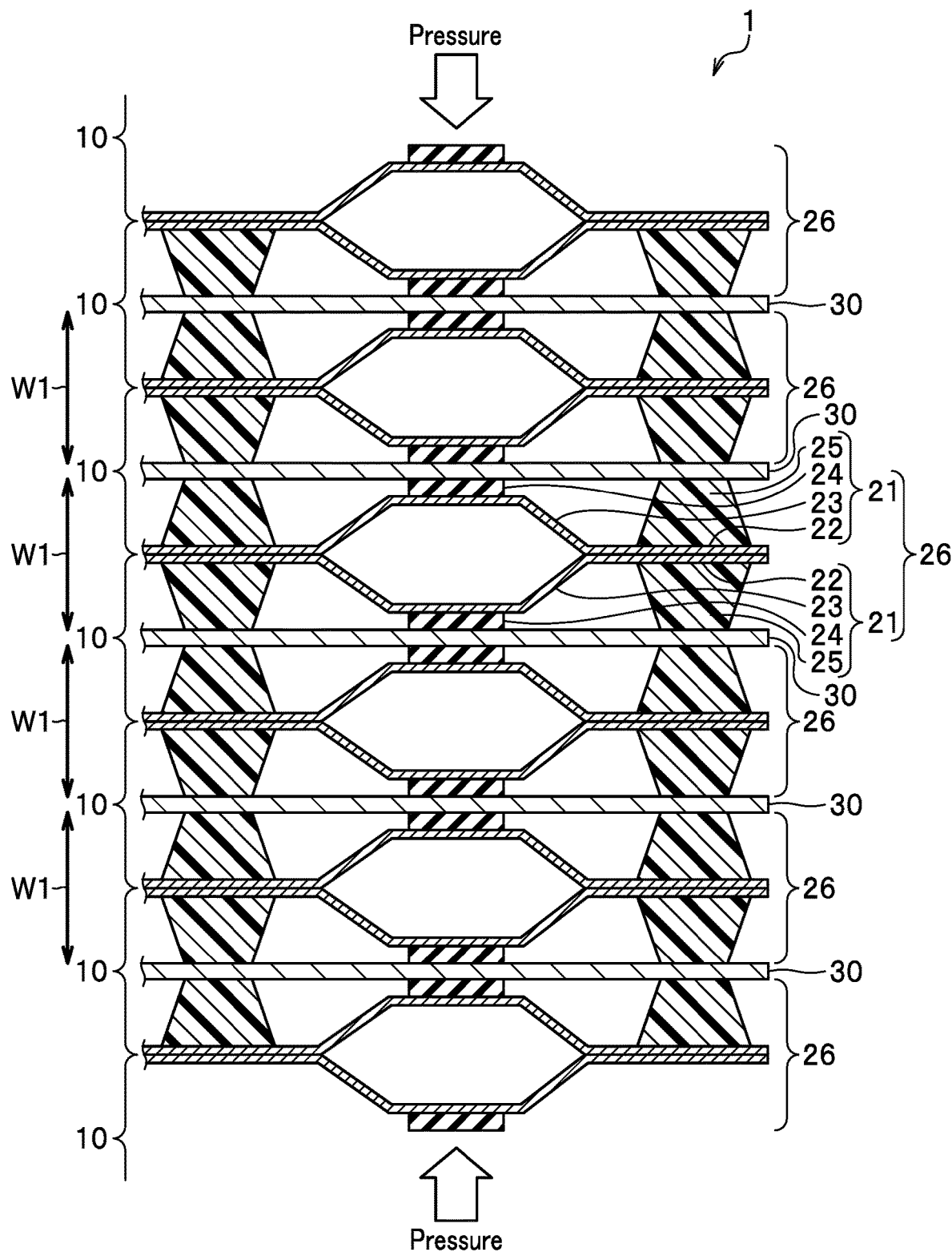
FIG. 5 is a cross-sectional view for explaining amounts of deformation of bead seal portions when a pressure is applied to the fuel cell seal structure according to Embodiment 1.

As shown in FIG. 5, in the stacking step, the electrolyte membranes 30 are interposed between a plurality of the joint separators 26 to form a stacked body. Lastly, a load is applied in the direction in which the joint separators 26 constituting the stacked body are adjacent to one another to integrate the joint separators 26. In this way, the fuel cell seal structure 1 (fuel cell stack) is completed.

(Operations and Effects)

As shown in FIG. 5, when a pressure (load) is applied to the fuel cell seal structure 1, each bead seal portion 23 bends and deforms. In the fuel cell seal structure 1, the stoppers 25 are disposed side by side with the bead seal portions 23 and along the bead seal portions 23. In this way, since a load acting in the stacking direction is supported by the stoppers 25, the deformation of the bead seal portions 23 is restricted by the stoppers 25. As a result, a variation in deformation among the bead seal portions 23 is made smaller, and clearances of the respective fuel cells 10 become uniform or substantially uniform. In the illustrated example, all distances W1 between the electrolyte membranes 30, 30, which each indicate the magnitude of deformation of the corresponding bead seal portion 23, are uniform.

In other words, according to this Embodiment, since the difference in amount of deformation among the bead seal portions 23 can be made smaller, the variation in bead reaction force acting on the bead seal portions 23 can be reduced. In this way, since a stable reaction force can be secured by the bead seal portions 23 and the elastic bodies 24 provided in the fuel cell seal structure 1, it is possible to bring the seal performances close to each other, and to thus improve the seal performances.

In addition, a larger load is likely to act on the outer edge of the metal separators 21. However, according to this Embodiment, the bead seal portions 23 (outer edge portions 23a) and the elastic bodies 24 are disposed along the outer edges of the metal separators 21 over the entire periphery, and the stoppers 25 are disposed along the bead seal portions 23 (outer edge portions 23a). This makes it possible to prevent the reaction gas from leaking from the outside of the fuel cells 10 and also to make the sealing more stable with the bead seal portions 23 and the elastic bodies 24.

In addition, a load is likely to concentrate on the through-holes 11 because the reaction gas flows through the through-holes 11 and the holes are formed. However, in this Embodiment, the bead seal portions 23 (surrounding portions 23b) and the elastic bodies 24 are disposed to surround the through-holes 11 and the stoppers 25 are disposed along the bead seal portions 23 (surrounding portions 23b). This makes it possible to prevent the reaction gas from leaking out of the through-holes 11, and to make the sealing more stable with the bead seal portions 23 and the elastic bodies 24.

In addition, disposing the stoppers 25, being continuous, makes it easier to prevent large deformation of the bead seal portions 23 associated with a pressure on the fuel cell seal structure 1 by means of the stoppers 25. This makes it possible to improve the stability of the seal performance by the bead seal portions 23 and the elastic bodies 24. In addition, since the stoppers 25 can be continuously formed, this makes it easy to form the stoppers 25.

In addition, the stoppers 25 are disposed away from the elastic bodies 24 provided on the front ends of the bead seal portions 23. Disposing the stoppers 25 in this way makes it possible to prevent an interference of the stoppers 25 with the elastic bodies 24. In addition, the stoppers 25 are formed as separate members from the bead seal portions 23 and the elastic bodies 24. This makes it possible to easily dispose the stoppers 25 and to enhance the degree of freedom in design.

Note that "disposed along the bead seal portion" in claims refers to extending in the same direction as the direction of extension of the bead seal portion 23. The "same direction" is not limited to strict parallel, and compasses a substantially parallel direction, a direction having an angle of, for example, 5° or less to the direction of extension, and the like.

In addition, the stoppers 25 are disposed side by side with the bead seal portions 23 and continuous along the bead seal portions 23. The "side by side with the bead seal portions 23" indicates positions closed to the bead seal portions 23 to such an extent that the amounts of deformation of the bead seal portions 23 become less than or equal to the allowable value when a normally assumed pressure acts on the fuel cell seal structure 1.

In addition, the positions to dispose the stoppers 25 are not limited to the positions in FIG. 2. The stoppers 25 may be disposed at any positions as appropriate depending on the shape and arrangement of the bead seal portions 23, for example. In addition, the thickness of the stoppers 25 is preferably smaller than the height to which the bead seal portions 23 protrude, but may be set as appropriate depending on the material of the stoppers 25 and the shape of the bead seal portions 23. In addition, the elastic modulus of the stoppers 25 is preferably larger than the elastic modulus of the bead seal portions 23, but may be set as appropriate depending on the material of the stoppers 25 and the shape of the bead seal portions 23.

Embodiment 2

Figure 6:
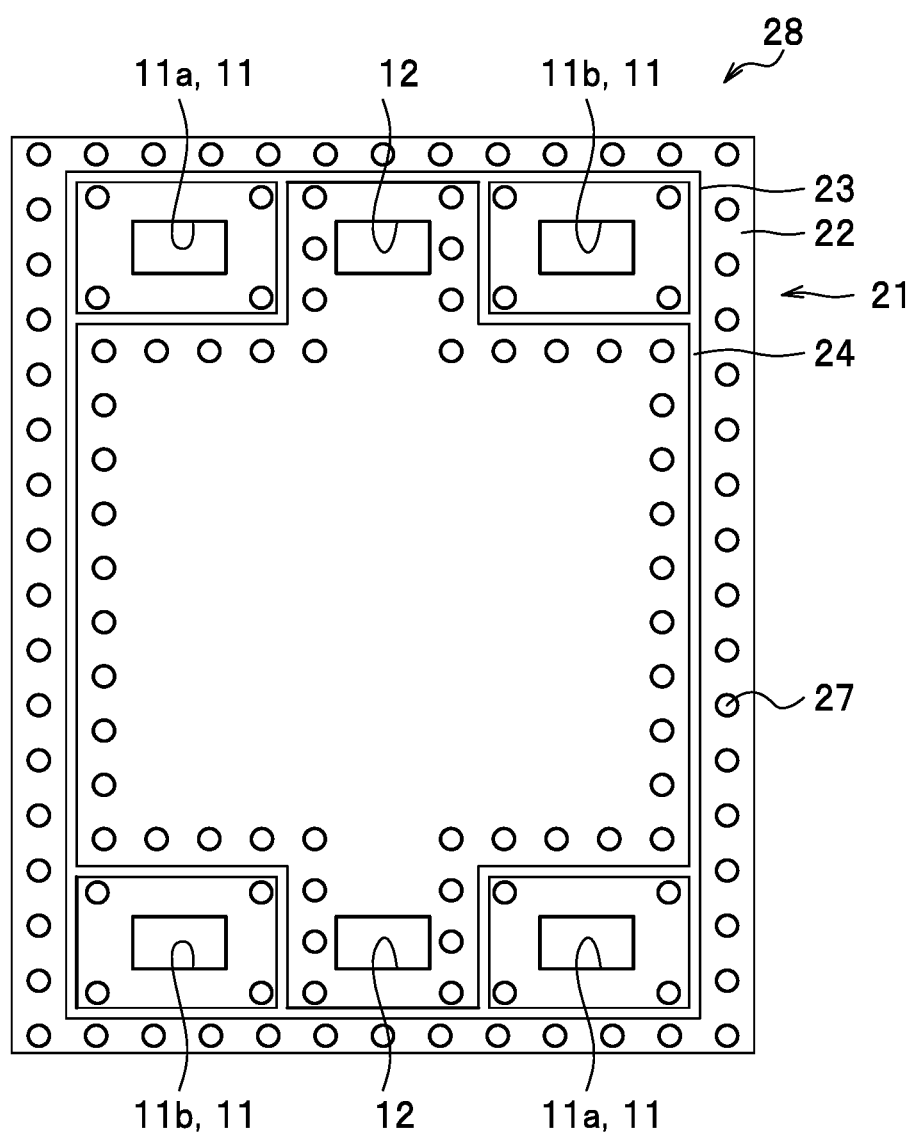
FIG. 6 is a top view of metal separators according to Embodiment 2.
Figure 7:
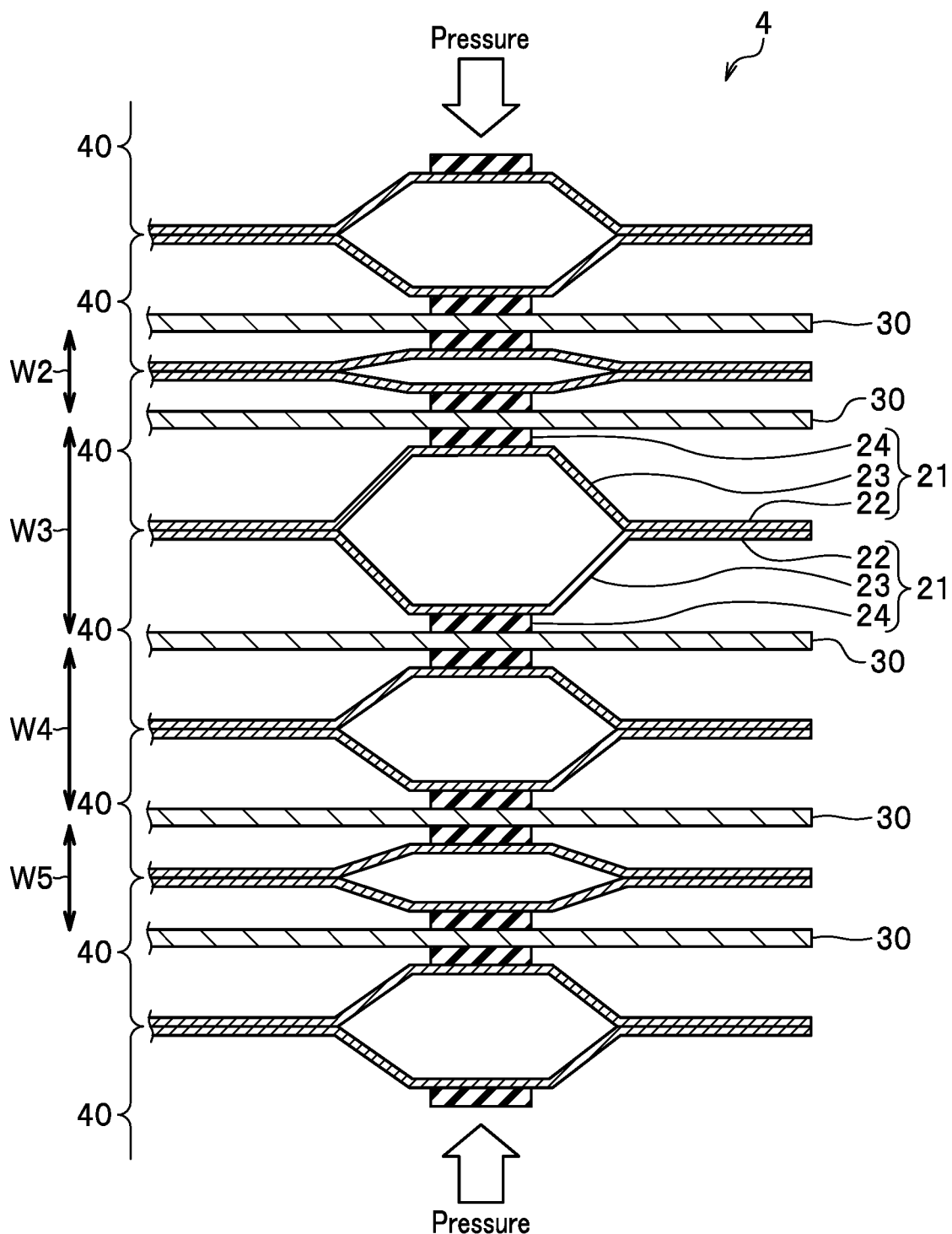
FIG. 7 is a cross-sectional view for explaining amounts of deformation of bead seal portions when a pressure is applied to a fuel cell seal structure according to Japanese Patent Application Publication No. 2017-139218.

FIG. 6 is a top view of a metal separator according to Embodiment 2. A metal separator 28 according to Embodiment 2 is the same as the metal separator 21 according to Embodiment 1 except that the metal separator 28 includes stoppers 27 in place of the stoppers 25 in the metal separators 21 (see FIG. 2) according to Embodiment 1.

In Embodiment 2, the stoppers 27 are disposed side by side with the bead seal portions 23 and discontinuously along the bead seal portion 23. In the illustrated example, the stoppers 27 each have a dot shape, and a plurality of the dots are disposed in the same direction as the direction of extension of the bead seal portions 23, so that the stoppers 27 are disposed with space intervals. Disposing the stoppers 27 discontinuously makes it easy to dispose the stoppers 27 in accordance with the shape of the bead seal portions 23, for example, and makes it possible to improve the degree of freedom in arrangement of the stoppers 27.

It is understood that the foregoing description is that of the preferred embodiments of the invention and that various changes and modifications may be made thereto without departing from the spirit and scope of the invention as defined in the appended claims.

What is claimed is:

1. A fuel cell seal structure comprising stacked fuel cells each including:
   (a) neighboring metal separators each including;
   (i) a plate portion having a plate portion surface;
   (ii) a bead seal portion projecting from the plate portion surface and including a distal end having a distal end surface;
   (iii) an elastic body disposed on the distal end surface;
   (iv) a stopper disposed on the plate portion surface and away from the elastic body;
   (b) an electrolyte membrane or a film supported between the neighboring metal separators, wherein
      the neighboring metal separators are disposed such that elastic bodies are located opposed to each other in a stacking direction with the electrolyte membrane or the film supported in between the elastic bodies and face each other, and such that stoppers are located neighboring to each other in the stacking direction with the electrolyte membrane or the film supported in between the stoppers.

2. The fuel cell seal structure according to claim 1, wherein
   the bead seal portion and the elastic body are disposed along an outer edge of each of the neighboring metal separators, and
   the stopper is disposed along the bead seal portion.

3. The fuel cell seal structure according to claim 1, wherein
   each of the neighboring metal separators includes a through-hole allowing a fuel gas or an oxidizer gas to flow therethrough in the stacking direction,
   the bead seal portion and the elastic body are disposed to surround the through-hole, and
   the stopper is disposed along the bead seal portion.

4. The fuel cell seal structure according to claim 1, wherein
   the stopper is disposed side by side with the bead seal portion and is continuous or discontinuous along the bead seal portion.

5. The fuel cell seal structure according to claim 2, wherein
   each of the neighboring metal separators includes a through-hole allowing a fuel gas or an oxidizer gas to flow therethrough in the stacking direction,
   the bead seal portion and the elastic body are disposed to surround the through-hole, and
   the stopper is disposed along the bead seal portion.

6. The fuel cell seal structure according to claim 2, wherein
   the stopper is disposed side by side with the bead seal portion and is continuous or discontinuous along the bead seal portion.

7. The fuel cell seal structure according to claim 3, wherein
   the stopper is disposed side by side with the bead seal portion and is continuous or discontinuous along the bead seal portion.

8. The fuel cell seal structure according to claim 5, wherein
   the stopper is disposed side by side with the bead seal portion and is continuous or discontinuous along the bead seal portion.

* * * * *